US011493311B2

(12) United States Patent
Dallas et al.

(10) Patent No.: US 11,493,311 B2
(45) Date of Patent: *Nov. 8, 2022

(54) NON-PYROTECHNIC AERIAL DISPLAY APPARATUS

(71) Applicant: Flyerworks LLP, Arvada, CO (US)

(72) Inventors: Benjamin Dallas, Leadville, CO (US); Michael Gilbert, Arvada, CO (US); Mitchell Ross, Broomfield, CO (US)

(73) Assignee: Flyerworks LLP, Arvada, CO (US)

( * ) Notice: Subject to any disclaimer, the term of this patent is extended or adjusted under 35 U.S.C. 154(b) by 162 days.

This patent is subject to a terminal disclaimer.

(21) Appl. No.: 16/934,532

(22) Filed: Jul. 21, 2020

(65) Prior Publication Data
US 2021/0398461 A1  Dec. 23, 2021

Related U.S. Application Data

(60) Provisional application No. 63/041,752, filed on Jun. 19, 2020.

(51) Int. Cl.
| | |
|---|---|
| *F42B 4/08* | (2006.01) |
| *F42B 12/42* | (2006.01) |
| *F42B 10/10* | (2006.01) |
| *F21V 14/00* | (2018.01) |
| *F21L 4/02* | (2006.01) |
| *F42B 10/58* | (2006.01) |

(Continued)

(52) U.S. Cl.
CPC ............... *F42B 4/08* (2013.01); *B64C 39/02* (2013.01); *B64D 41/00* (2013.01); *B64D 47/02* (2013.01); *F21L 4/00* (2013.01); *F21L 4/027* (2013.01); *F21V 14/00* (2013.01); *F41B 11/62* (2013.01); *F41B 11/72* (2013.01); *F42B 10/10* (2013.01); *F42B 10/58* (2013.01); *F42B 12/42* (2013.01); *B64C 2201/12* (2013.01); *B64D 2203/00* (2013.01); *F21Y 2115/10* (2016.08); *F41C 3/005* (2013.01); *F42B 6/10* (2013.01)

(58) Field of Classification Search
CPC .. F42B 4/08; F42B 10/58; F42B 10/10; B64C 39/02; B64D 41/00; B64D 47/02; F21L 4/00; F21L 4/27; F21V 14/00; F41B 11/62; F41B 11/72; F21Y 2115/10
See application file for complete search history.

(56) References Cited

U.S. PATENT DOCUMENTS

| 2,145,972 A | 2/1939 | Clark et al. |
| 3,559,331 A | 2/1971 | Eller |

(Continued)

*Primary Examiner* — Andrew J Coughlin
*Assistant Examiner* — Jessica M Apenteng
(74) *Attorney, Agent, or Firm* — Nicholas J. Boyarski

(57) ABSTRACT

A non-pyrotechnic aerial display apparatus may include a head portion and a wing portion. The head portion may include a front portion, a rear portion, and a plurality of channels extending from the front portion toward the rear portion. The wing portion may extend rearward from the head portion. The wing portion may include a top surface, a bottom surface, a leading edge, a trailing edge, a rear edge extending from the leading edge to the trailing edge, and an airfoil extending along the leading edge. The wing portion may include a counterweight. The apparatus may include one or more forward-facing lights. The apparatus may include one or more rearward-facing lights. Other examples may be described and claimed.

20 Claims, 11 Drawing Sheets

(51) Int. Cl.
*F21L 4/00* (2006.01)
*F41B 11/72* (2013.01)
*B64C 39/02* (2006.01)
*B64D 41/00* (2006.01)
*B64D 47/02* (2006.01)
*F41B 11/62* (2013.01)
*F21Y 115/10* (2016.01)
*F42B 6/10* (2006.01)
*F41C 3/00* (2006.01)

(56) References Cited

U.S. PATENT DOCUMENTS

| | | | |
|---|---|---|---|
| 5,173,069 A * | 12/1992 | Litos | A63H 33/185 |
| | | | 473/590 |
| 6,408,837 B1 | 6/2002 | Johnson et al. | |
| 6,443,792 B1 | 9/2002 | Forti et al. | |
| 6,648,726 B2 | 11/2003 | Hornsby et al. | |
| 6,840,177 B1 | 1/2005 | Hatteland | |
| 6,866,229 B1 | 3/2005 | Tabor et al. | |
| 7,101,249 B2 | 9/2006 | Forti et al. | |
| 7,261,037 B2 * | 8/2007 | Joseph, Jr. | F42B 4/08 |
| | | | 42/1.15 |
| 10,370,101 B2 | 8/2019 | Kales | |
| 2006/0183398 A1 | 8/2006 | Barnes | |
| 2007/0181114 A1* | 8/2007 | Tippmann | F41B 11/51 |
| | | | 42/114 |
| 2012/0020050 A1* | 1/2012 | Longo | F42B 12/40 |
| | | | 362/34 |
| 2013/0074818 A1 | 3/2013 | Victor et al. | |
| 2013/0239935 A1 | 9/2013 | Martinez | |
| 2019/0301843 A1 | 10/2019 | Hammond | |

\* cited by examiner

NON-PYROTECHNIC AERIAL DISPLAY APPARATUS

CROSS-REFERENCE TO RELATED APPLICATION

This application claims the benefit of U.S. Provisional Patent Application No. 63/041,752 filed Jun. 19, 2020, which is hereby incorporated by reference in its entirety as if fully set forth herein.

FIELD

This disclosure relates to a non-pyrotechnic aerial display apparatus and method.

BACKGROUND

Fireworks are examples of low-explosive pyrotechnic devices. Pyrotechnic devices employ self-contained exothermic chemical reactions to produce light, heat, gas, smoke, and/or sound. Fireworks may include black powder and other chemicals that, when lit, emit colored flames, sparks, smoke, and/or sounds (e.g. crackles, whistles, and/or bangs). Fireworks are popular throughout the world and provide visual entertainment at a wide variety of cultural celebrations.

Fireworks may be classified as ground-level or aerial fireworks. Aerial fireworks launch into the sky, explode, and produce visual and auditory effects. Aerial fireworks may include an aerial shell. The aerial shell may include a fuse, container, bursting charge, black powder, and pyrotechnic stars. The container may be a formed of paper or pasteboard. The pyrotechnic stars may be combustible material, such as a sparkler compound formed into pea-size spheres. The bursting charge may be a firecracker-like charge positioned at the center of the shell. The fuse may be connected to the bursting charge and extend from the container. The fuse may provide a time delay that allows the shell to travel to a desired altitude before exploding. The aerial shell may be launched from a mortar. The mortar may be a metal pipe. A lifting charge containing black powder may be placed in the mortar beneath the shell. Detonating the lifting charge may ignite the fuse and propel the shell high into the air. The fuse may burn as the shell rises to a desired altitude and then ignite the bursting charge. Ignition of the bursting charge may ignite the pyrotechnic stars, which may produce colored flames and sparks that provide visual entertainment to onlookers.

SUMMARY

Aerial firework displays are a popular source of visual entertainment for people of all ages around the world. Unfortunately, firework displays have several drawbacks that may limit their enjoyment. First, fireworks may unintentionally ignite wildfires. Fire danger may be elevated in drought-stricken regions of the American west where fireworks are often banned during summer months to comply with fire prevention measures. Second, fireworks emit smoke and pollution that may be harmful to inhale, especially for individuals with respiratory diseases. When hundreds of individual fireworks are detonated during an event, the smoke produced can be substantial. Third, exploding fireworks produce loud noises that may frighten children and induce stress in pets.

A non-pyrotechnic substitute for conventional fireworks is needed that delivers the positive attributes of fireworks but eliminates the negative attributes of fireworks. More specifically, an aerial display apparatus and method are needed that provide safe, high-quality visual entertainment but pose no fire danger and can be noiseless and smokeless, if desired.

A non-pyrotechnic aerial display apparatus and method are described herein. Unlike conventional fireworks, the apparatus may not employ pyrotechnics for propulsion or visual effects. Instead, compressed air may be used to launch the apparatus high into the sky. In one example, the apparatus may be configured to launch from a barrel of a pneumatic gun. The apparatus may launch like a rocket with high velocity and low aerodynamic drag. Upon reaching an apex of a flight trajectory, the apparatus may transition to a slow descent with a helicopter-like rotation, similar to a flight pattern of a maple seed. This slow descent may prolong decent and increase the duration of visual entertainment. The apparatus may be equipped with one or more light emitting diodes (LEDs). Rotation of the apparatus with LEDs during descent may produce visual entertainment for onlookers. Unlike conventional fireworks that self-destruct, the apparatus may be reusable. This summary is not limiting. This summary is not limiting. Additional features and examples of the apparatus are described in the Detailed Description and shown in the Drawings.

DETAILED DESCRIPTION

A non-pyrotechnic aerial display system can include an aerial display apparatus (referred to herein as a "flyer") 100 and a launcher 200. Together, the flyer 100 and pneumatic gun 200 may provide a system for creating an aerial display for onlookers. In some examples, non-pyrotechnic aerial display system may include an arrangement of tens or hundreds of pairs of flyers and pneumatic guns configured to produce an aerial display that is a safe, quiet, smokeless alternative to conventional fireworks. The system may include an electronic control system to control launch timing, sequencing, and charge pressures of each individual flyer. The electronic control system may include computer-readable software instructions. The system may be used, for example, at cultural celebrations, sporting events, and theme parks to provide visual entertainment for onlookers.

Figure 1:
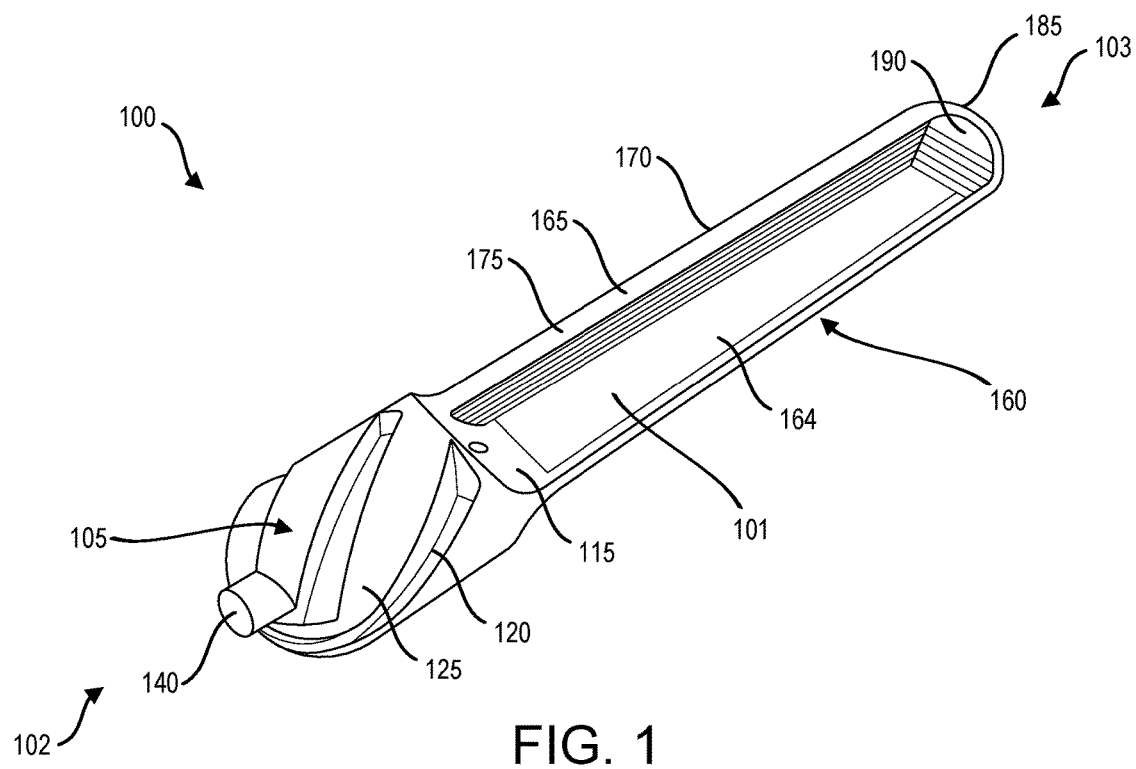
FIG. 1 shows a front perspective view of a non-pyrotechnic aerial display apparatus.

An example flyer 100 is shown in FIG. 1. The flyer 100 may include a body portion 101. The body portion 101 may include a front end 102 and a rear end 103. The flyer 100 may include a head portion 105 at or proximate to the front portion. The flyer 100 may include a wing portion 160 extending rearward from the head portion 105. The head portion and the wing portion may be a unibody construction. Alternately, the head portion and the wing portion may be two or more pieces joined to form the body portion 101. In one example, the flyer 100 may be made of a polymer material, such as polylactic acid (PLA), polycarbonate, or thermoplastic copolyester.

Figure 13:
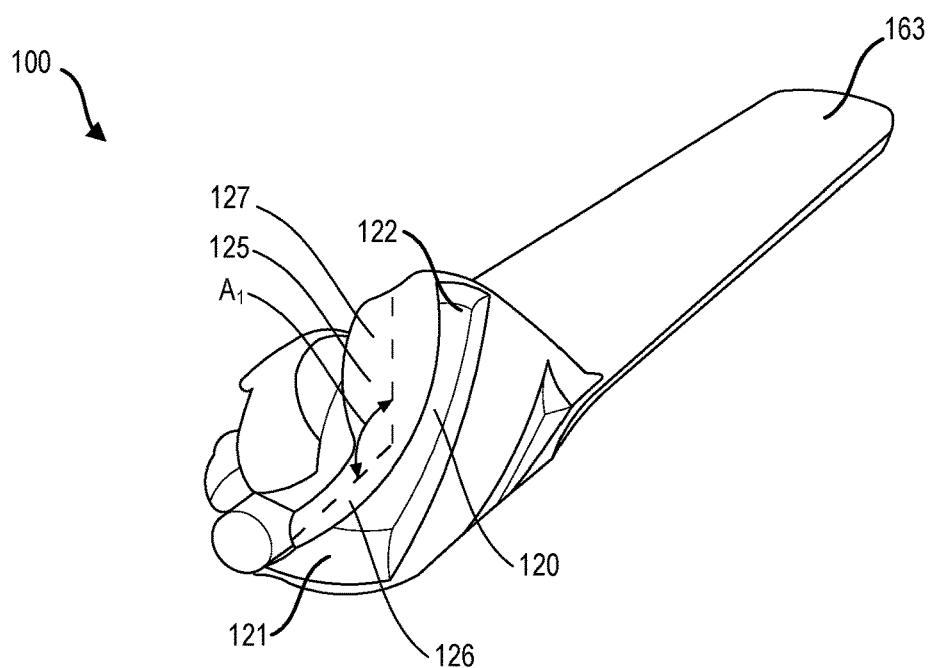
FIG. 13 shows a front perspective view of the apparatus of FIG. 1.

The head portion 105 may have a front portion 106 and a rear portion 107. The head portion 105 may include a nose 110 at the front portion 106. The nose 110 may be at the front end of the apparatus 100. The nose 110 may be a hemispherical nose 110. The head portion 105 may include a plurality of vanes 125 extending from the front portion 106 of the head portion toward the rear portion of the head portion. Each vane 125 may have a first portion 126 and a second portion 127. An intersection between centerlines of the first portion 126 and the second portion 127 of the vane 125 may form an angle ($A_1$), as shown in FIG. 13. The angle ($A_1$) may be greater than ninety degrees. The angle ($A_1$) may be between 110 and 160 degrees. The angle ($A_1$) may be between 120 and 150 degrees. The angle ($A_1$) may be between 125 and 145 degrees. Preferably, the angle ($A_1$) may be about 135 degrees.

The head portion 105 may include a plurality of channels 120 extending from the front portion 106 of the head portion toward the rear portion 107 of the head portion. Each channel may be located between two adjacent vanes 125. The channels 120 may be nonparallel to a central axis 197 of the apparatus 100. The channels 120 may be angled channels relative to a central axis of the head portion. The channels 120 may be spiral channels along an outer surface of the head portion.

Figure 4:
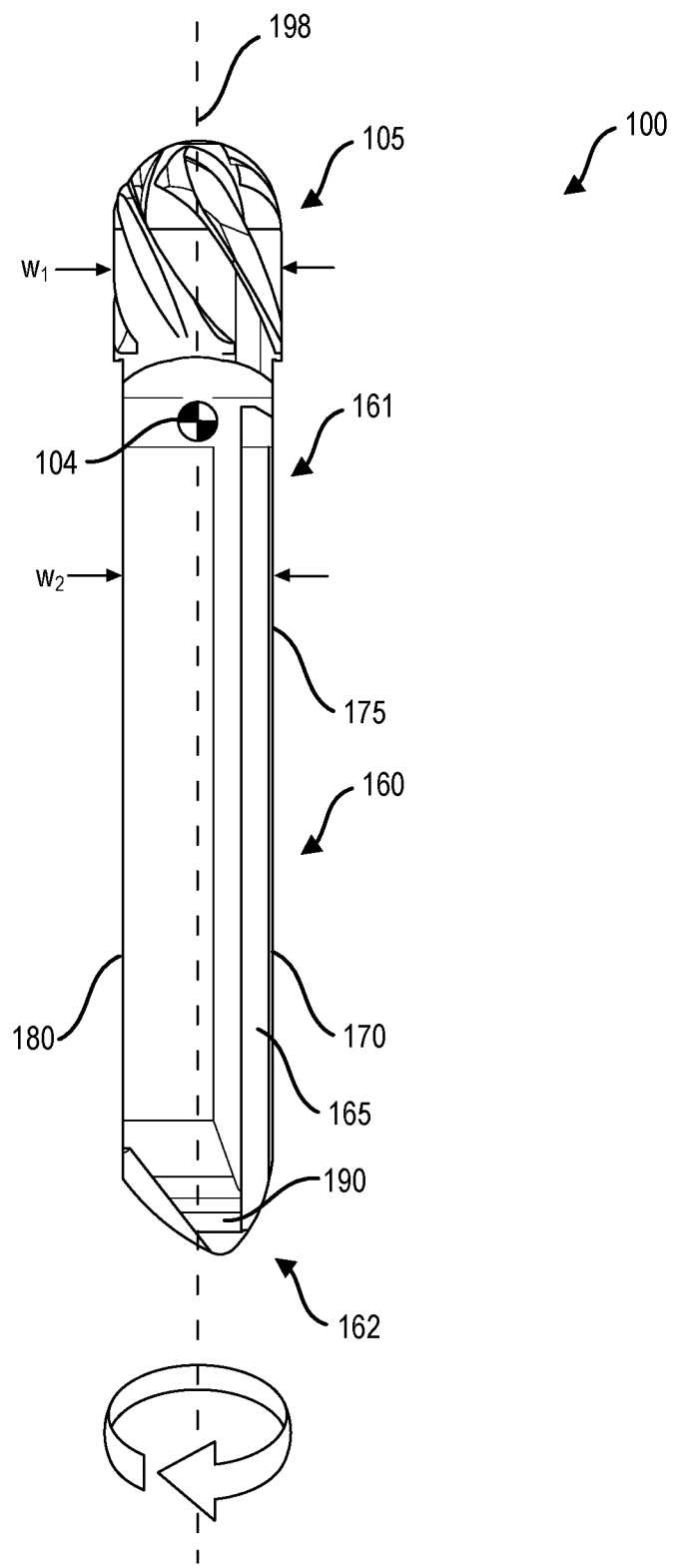
FIG. 4 shows a rotation axis of the apparatus during an ascent stage of the flight trajectory of FIG. 3.
Figure 11:
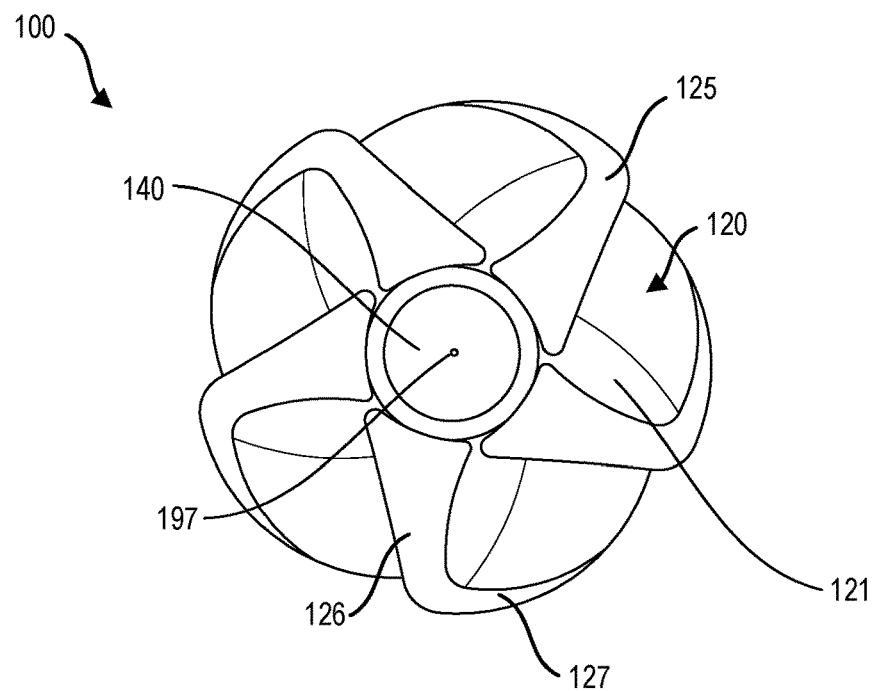
FIG. 11 shows a front view of the apparatus of FIG. 1.
Figure 12:
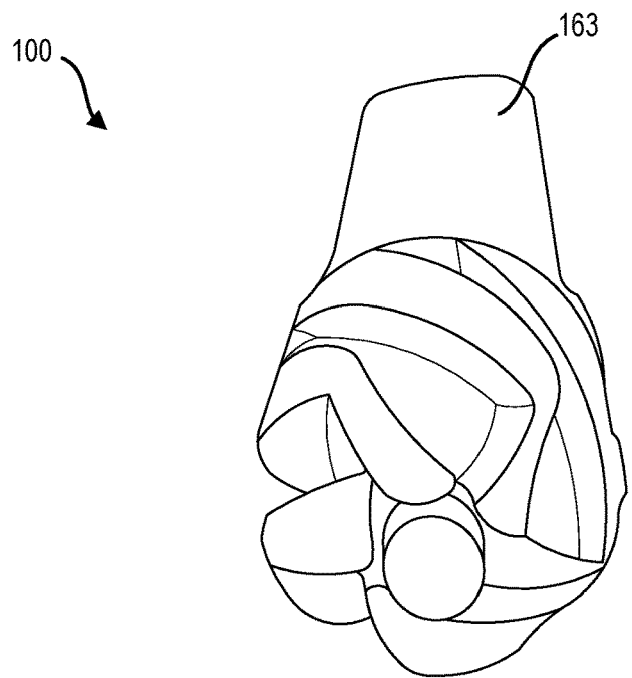
FIG. 12. shows a front perspective view of the apparatus of FIG. 1.

Each channel 120 may have an intake region 121 located at the front portion of the head portion, as shown in FIG. 11. During flight, the channel 120 may induct air through the intake region 121, and the incoming air may impact and apply force against the second portion 127 of each vane 125, thereby inducing torque and rotation of the flyer about a first rotation axis 198 during ascent, as shown in FIG. 4. The first rotation axis 198 may be colinear with the central axis 197 of the apparatus. Inducted air may exhaust from the channel 120 through an exhaust region 122. The exhaust region 122 may be located along the outer surface 108 of the head portion 105, as shown in FIG. 13. A cross-sectional area of the intake region 121 may be greater than a cross-sectional area of the exhaust region 122. Consequently, incoming air may be compressed as it travels through the channel 120. Compression of inducted air through the channels may stabilize flight of the flyer. Compression of inducted air through the channels may induce rotation of the flyer. The channels 120 may be arranged uniformly around the central axis 197, as shown in FIG. 11. The head portion 105 may include five channels 120. In another example, the head portion 105 may include more than five channels. In another example, the head portion 105 may include fewer than five channels. The head portion 105 may include five vanes 125. In another example, the head portion 105 may include more than five vanes 125. In another example, the head portion 105 may include fewer than five vanes 125.

Figure 14:
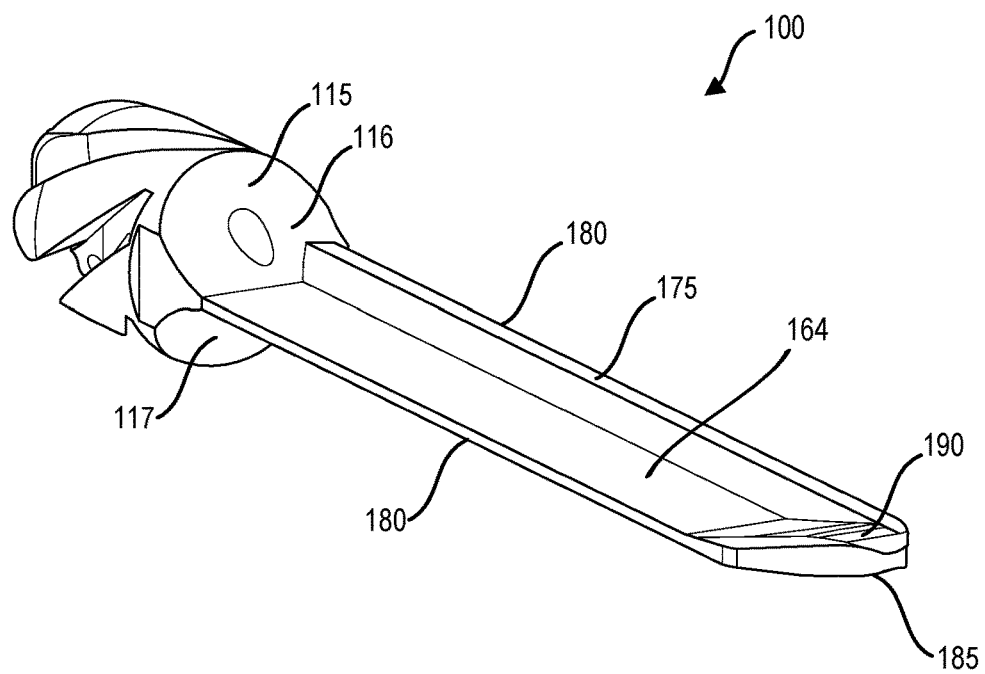
FIG. 14 shows a rear perspective view of the apparatus of FIG. 1.
Figure 15:
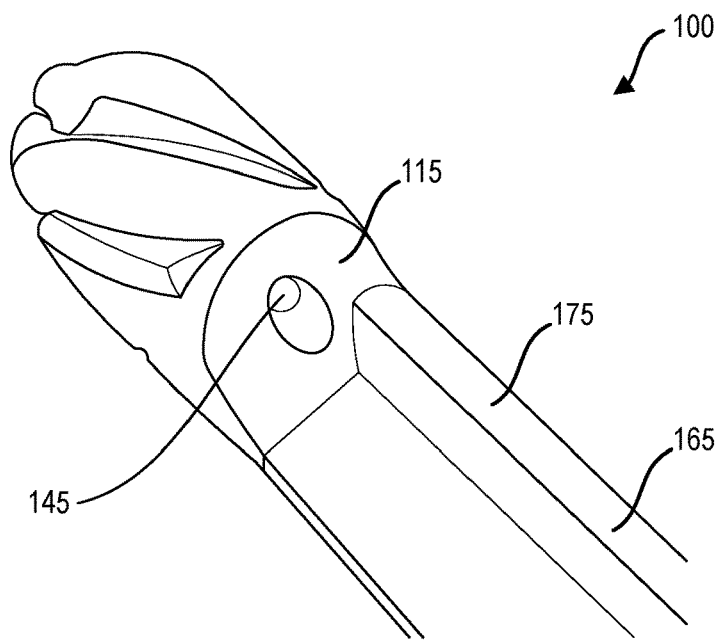
FIG. 15 shows a rear perspective view of the head portion and transition portion of the apparatus of FIG. 1.
Figure 16:
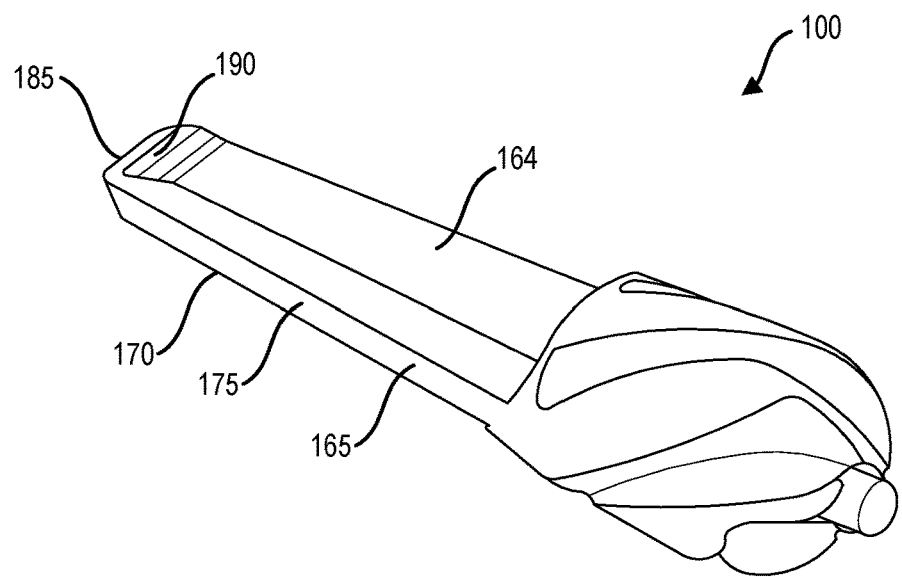
FIG. 16 shows a front perspective view of the apparatus of FIG. 1.
Figure 17:
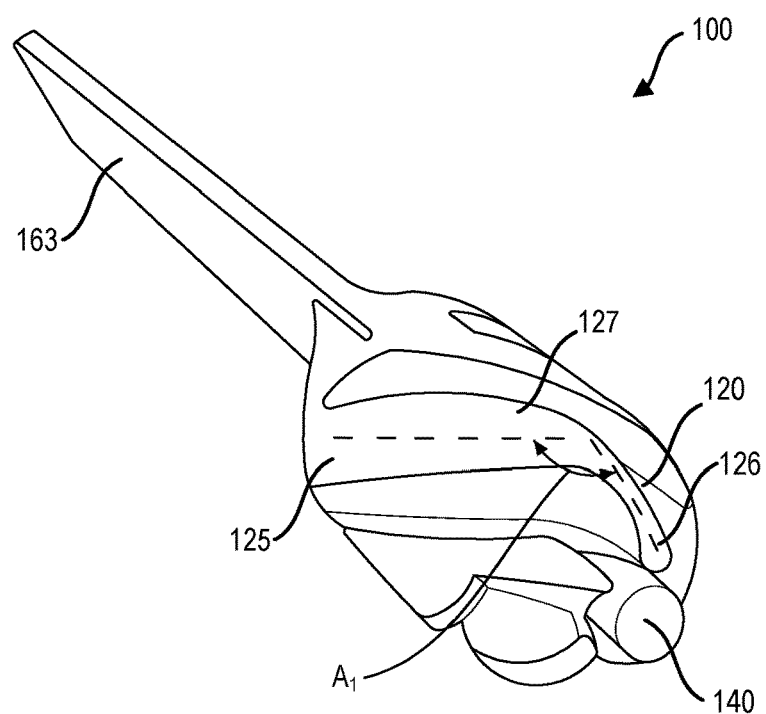
FIG. 17 shows a front perspective view of the apparatus of FIG. 1.
Figure 18:
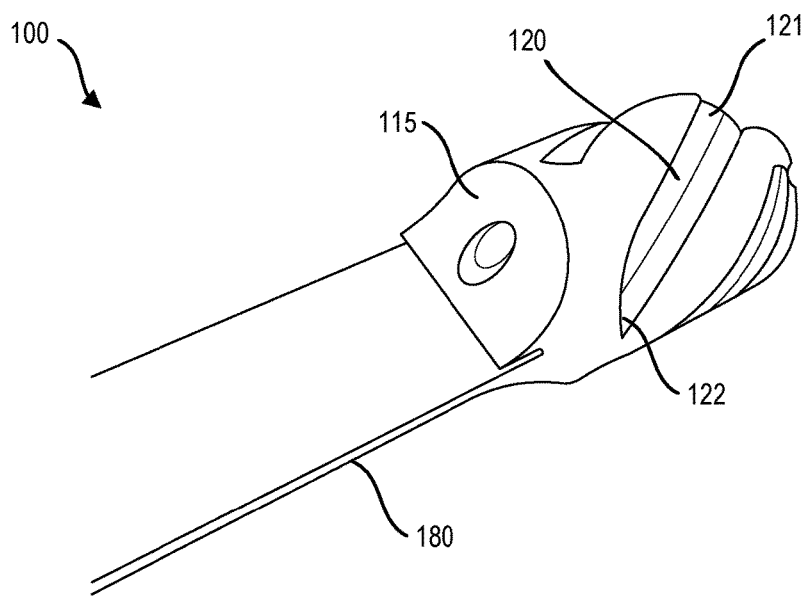
FIG. 18 shows a top perspective view of the head portion and transition portion of the apparatus of FIG. 1.

The flyer 100 may include a wing portion 160. The wing portion 160 may extend rearward from the head portion 105. The wing portion 160 may be a fixed wing. The wing portion 160 may have a front portion 161 and a rear portion 162, as shown in FIG. 4. The front portion 161 of the wing portion 160 may be connected to the rear portion 107 of the head portion 105. The wing portion 160 may have a top surface 163 and a bottom surface 164, as shown in FIGS. 13 and 14, respectively. The wing portion 160 may include a leading edge 170 and a trailing edge 180. The leading edge 170 may have a thickness greater than a thickness of the trailing edge 180. The top surface 163 of the wing portion 160 may be substantially flat. The top surface 163 may be a suitable surface for printing promotional or advertising information. For example, when launching a flyer at a public event, a coupon may be printed on the flyer that confers a certain redeemable benefit to a holder.

The wing portion 160 may include an airfoil 165 along the leading edge to produce aerodynamic lift and drag during descent. The airfoil 165 may slow the descent stage 315 of the flyer 100 and increase viewing duration for onlookers. The airfoil 165 may have a decreasing thickness in a direction from the leading edge toward the trailing edge.

The wing portion 160 may include a spine 175 along or proximate to the leading edge 170. The spine 175 may extend along the leading edge 170. The spine 175 may increase the weight of the leading edge 170 to a value greater than the weight of the trailing edge 180. The spine 175 may stiffen the wing portion 160 and stabilize the flyer during ascent and descent. A stiffened wing portion 160 may make the flyer 100 less likely to diverge from a desired straight upward trajectory during ascent 305. A stiffened wing portion 160 may improve consistency of rotational rate of the flyer 100 during descent 315.

The wing portion 160 may have a maximum width ($w_2$) that is less than or equal to a maximum width ($w_1$) of the head portion 105, as shown in FIG. 4. These relative widths may allow the flyer 100 to be loaded into and launched from the barrel 210 of the launcher 200 without the wing portion 160 creating an undue friction force against an interior surface of the barrel 210 during launching. Hence, $w_2$ being less than $w_1$ may increase launch velocity, which may increase a maximum height (h) attainable by the flyer 100. With $w_2$ less than $w_1$, the wing portion 160 may remain within a turbulent wake of the head portion 105 during ascent and thereby allow the flyer 100 to achieve a substantially straight upward trajectory without unwanted divergence. Hence, $w_2$ being less than $w_1$ may improve flight control and safety of the flyer 100, which may be important when launching the flyer at public gatherings with many onlookers.

Figure 5:
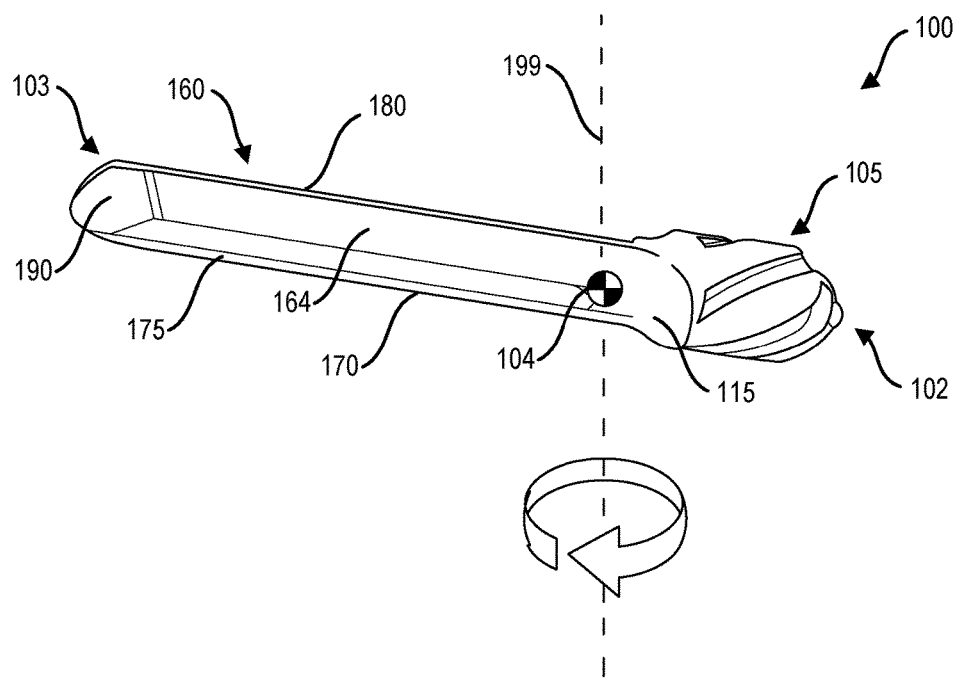
FIG. 5 shows a rotation axis of the apparatus during a descent stage of the flight trajectory of FIG. 3.

The wing portion 160 may include a counterweight 190 at or proximate to the rear end 103 of the flyer 100. The counterweight 190 may stabilize the wing portion 160 during ascent by providing a downward gravitational force on wing portion 160, thereby encouraging the wing portion to remain within a turbulent wake created by the head portion 105. During descent, the counterweight 190 may offset the weight of the head portion 105, as shown in FIG. 5. Placement of the counterweight 190 may promote rotation of the flyer 100 about a second rotation axis 199 during descent, as shown in FIG. 5.

Figure 6:
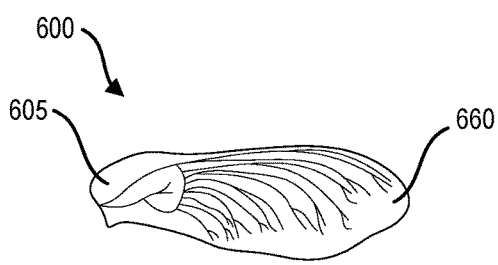
FIG. 6 shows a top view of a maple seed.
Figure 7:
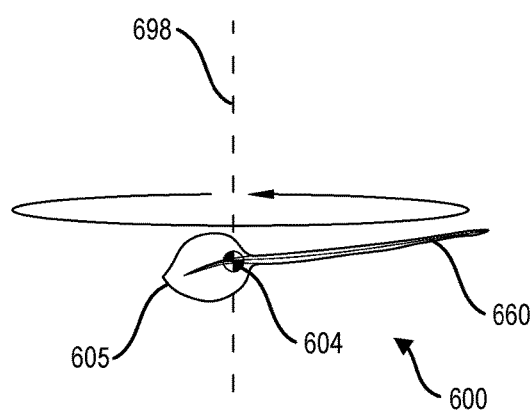
FIG. 7 shows a rotation axis of the maple seed of FIG. 6 during a descent stage of flight.

Rotation of the flyer 100 during descent may mimic rotational descent of a maple seed 600, as shown in FIG. 7. The maple seed 600 may have a seed portion 605 and a wing portion 660 extending from the seed portion, as shown in FIG. 6. During descent, the maple seed 600 may rotate around a rotation axis 698, which may be vertical and intersect a center of gravity 604 of the maple seed. During descent, passing air may exert a lift force on the wing portion 660. The lift force may cause upward bias of the wing portion 660 relative to the seed portion 605, as shown in FIG. 7.

Similar to the maple seed 600, the second rotation axis 199 of the flyer 100 may be vertical and may intersect a center of gravity 104 of the flyer 100, as shown in FIG. 5. During descent, passing air may exert a lift force on the wing portion 160. The lift force may cause upward bias of the wing portion 160 relative to the head portion 105.

Figure 9:
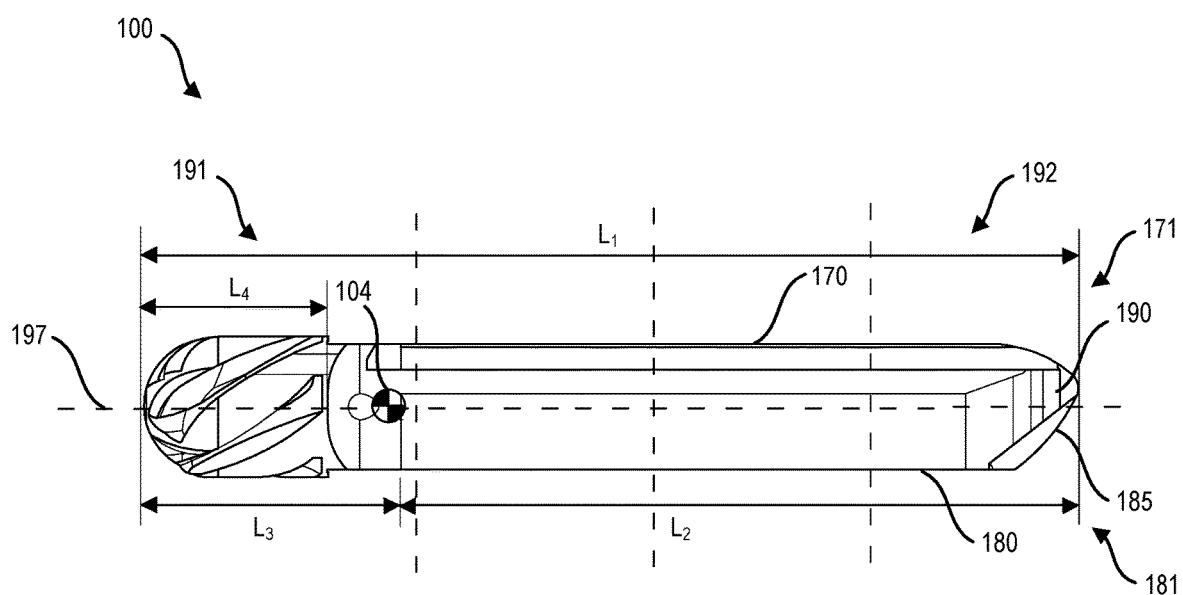
FIG. 9 shows a bottom view the apparatus of FIG. 1.

Helicopter-like rotation of the flyer 100 during descent 315 may be encouraged by the counterweight 190. The counterweight 190 may be located in a rear quarter 192 of the flyer 100, as shown in FIG. 9. The counterweight 190 may be located at or proximate to a rear end 103 of the flyer 100. The counterweight 190 may extend from the spine portion 175 to a rear edge 185 of the wing portion. The counterweight 190 may extend from the leading edge 170 to the trailing edge 180.

The central axis 197 of the flyer 100 may divide the wing portion 160 into a first half including the leading edge 170 (a leading edge side) and a second half including the trailing edge 180 (a trailing edge side), as shown in FIG. 9. The rear edge 185 may extend from the first half to the second half. The rear edge 185 may extend from the leading edge 170 to the trailing edge 180. The rear edge 185 may be asymmetrical relative to the central axis 197. The central axis 197 may separate a leading edge side 171 of the wing portion 160 from a trailing edge side 181 of the wing portion 160. The rear edge 185 may extend farther rearward on the leading edge side 171 than on the trailing edge side 181. The asymmetrical rear edge 185 may form a tomahawk-shaped tail. The asymmetrical rear edge 185 may aid in stabilizing flight. The asymmetrical rear edge 185 may aid in initiating rotation about the second rotation axis 199 during descent.

Figure 19:
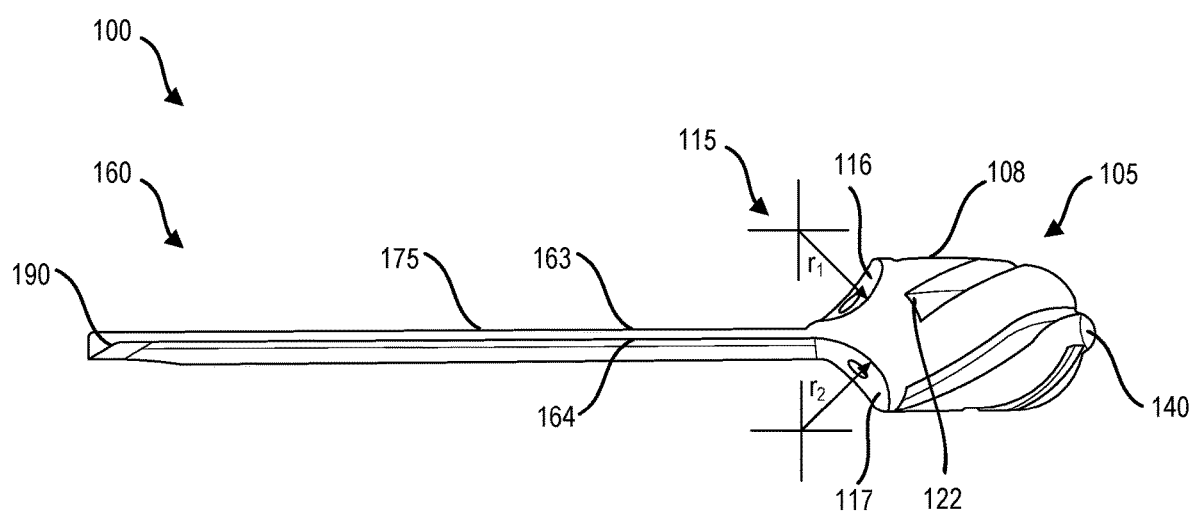
FIG. 19 shows a side view of the apparatus of FIG. 1.
Figure 20:
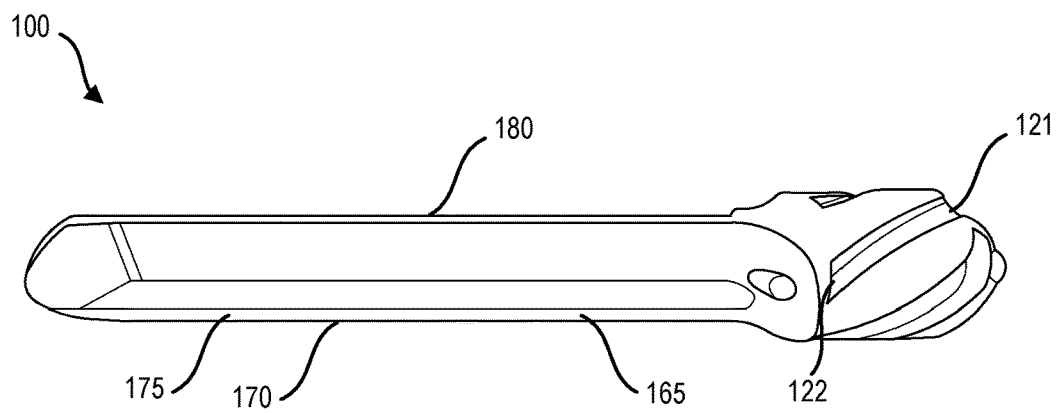
FIG. 20 shows a side perspective view of the apparatus of FIG. 1.

The head portion 105 may include a transition region 115 where the head portion meets the wing portion 160, as shown in FIG. 19. The transition region 115 may have a first contoured surface 116 extending from an outer surface 108 of the head portion 105 to the top surface 163 of the wing portion 160. The transition region 115 may have a second contoured surface 117 extending from the outer surface 108 of the head portion 105 to the bottom surface 164 of the wing portion 160. The first contoured surface 116 may have a first radius ($r_1$). The second contoured surface 117 may have a second radius ($r_2$) substantially equal to the first radius. Together, the first and second contoured surfaces (116, 117) may provide a finger hold for grasping the flyer between an index finger and thumb. Together, the first and second contoured surfaces (116, 117) may provide a surface area centered about the central axis 197 of the flyer 100 upon which a propulsion force can be exerted from behind during a launch stage.

Figure 21:
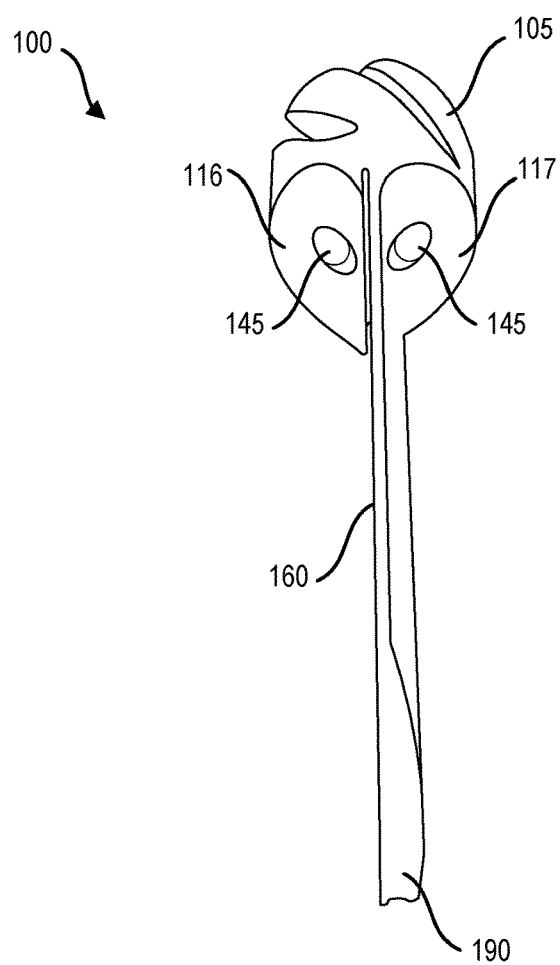
FIG. 21 shows a rear perspective view of the apparatus of FIG. 1.

The head portion 105 may include one or more lights. The lights may be light-emitting diodes (LEDs). The head portion 105 may include one or more forward-facing lights 140, as shown in FIG. 1. The head portion 105 may include one or more rearward-facing lights 145, as shown in FIG. 21. A first rearward-facing light 145 may be positioned in the first contoured surface 116. A second rearward-facing light 145 may be positioned in the second contoured surface 117. Positioning the first and second rearward-facing lights equidistant from the central axis 197 of the flyer 100 may provide balanced weight distribution and ensure a straight flight trajectory during ascent 305. Including forward-facing lights 140 and rearward-facing lights 145 may enhance visual effects during both ascent and descent stages of flight. For instance, the rearward-facing light 145 may allow onlookers to visually track the flyer's ascent from launch, thereby mimicking light emitted by conventional fireworks during ascent. During descent, as the flyer produces helicopter-like flight, front and rear facing lights may produce multiple light spirals descending to earth. In one example, the forward-facing light 140 and the rearward-facing light 145 may produce the same light color. In another example, the forward-facing light 140 may produce a first light color, and the rearward-facing light 145 may produce a second light color that differs from the first light color.

Figure 10:
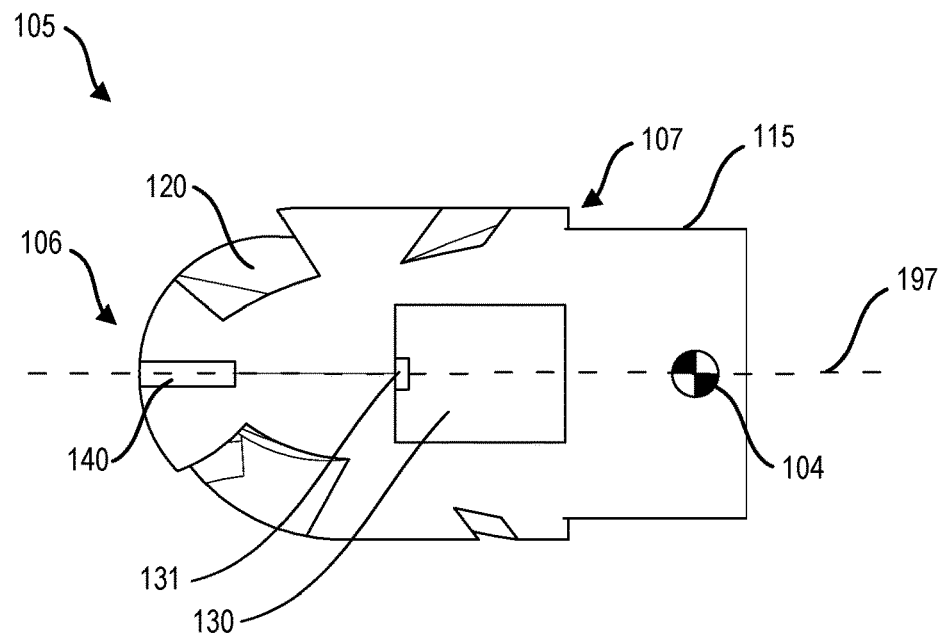
FIG. 10 shows a partial cross-sectional view of the head portion and transition portion of the apparatus of FIG. 1.

FIG. 10 shows a cross-sectional side view of the head portion 105 and transition region 115. The head portion 105 may include a battery pocket 130 configured to receive a battery (not shown). The battery pocket 130 may include an electrical lead 131. The electrical lead 131 may facilitate an electrical connection between a battery and the forward-facing LED 140. The electrical lead 131 may facilitate an electrical connection between a battery in the pocket 130 and the rearward-facing LED 145. The electrical lead 131 may facilitate an electrical connection between a battery in the pocket 130 and the forward-facing LED 140. The battery pocket 130 may be centered with respect to the central axis 197 to provide uniform weight distribution of the battery. The apparatus may include a switch (not shown) to power the lights on and off.

The size and relative dimensions of the flyer 100 may be adjusted to suit a particular application and may depend on factors such as desired height (h), flight time, launch velocity, payload, weather (e.g. temperature, wind speed, and humidity), flyer material properties (e.g. density, modulus of elasticity), rotation speed, and/or elevation.

As shown in FIG. 9, the flyer 100 may have an overall length ($L_1$), a wing portion 160 length ($L_2$), a head portion 105 and transition region 115 length ($L_3$), and a head portion 105 length ($L_4$). The wing portion length ($L_2$) may be at least twice as long as the head portion length ($L_4$). The wing portion length ($L_2$) may be at least three times as long as the head portion length ($L_4$). As shown in FIG. 4, the flyer 100 may have a head portion width ($w_1$) and a wing portion width ($w_2$). The wing portion width ($w_2$) may be less than or equal to the head portion width ($w_1$), which may improve straightness of the ascent trajectory 305 by preventing the wing portion 160 from disrupting the ascent trajectory. For instance, during ascent, the wing portion 160 may reside in a low-pressure zone formed behind the head portion 105 and may not significantly disrupt airflow passing over the outer surface 108 of the head portion 105.

In one example, the flyer 100 may be configured to launch from a ¾" barrel. An overall length ($L_1$) of the flyer 100 may be about 4 to 6 inches and preferably about 5 inches. The wing portion length ($L_2$) may be about 2.5 and 4.5 inches and preferably about 3.7 inches. The head portion and transition region length ($L_3$) may be about 1 to 2 inches and preferably about 1.4 inches. The head portion length ($L_4$) may be about 0.5 and 1.5 inches and preferably about 1 inch. The head portion width ($w_1$) may be less than 0.75 inches. The wing portion width ($w_2$) may be less than 0.75 inches.

The center of gravity 104 may be located rearward of the head portion 105. The center of gravity 104 of the flyer 100 may be located near the transition region 115, as shows in FIG. 5. Positioning the center of gravity 104 at this location may allow the flyer 100 to rotate like a maple seed 600 during descent. FIG. 7 shows autorotation of a maple seed 600 during descent. The center of gravity 104 may be located in a front quarter 191 of the flyer 100, as shown in FIG. 9. The center of gravity 104 may be intersected by the central axis 197. An intersection may exist between the head portion and the wing portion. The center of gravity 104 may be located a distance from the intersection of less than or equal to 15% of the overall length ($L_1$).

Figure 8:
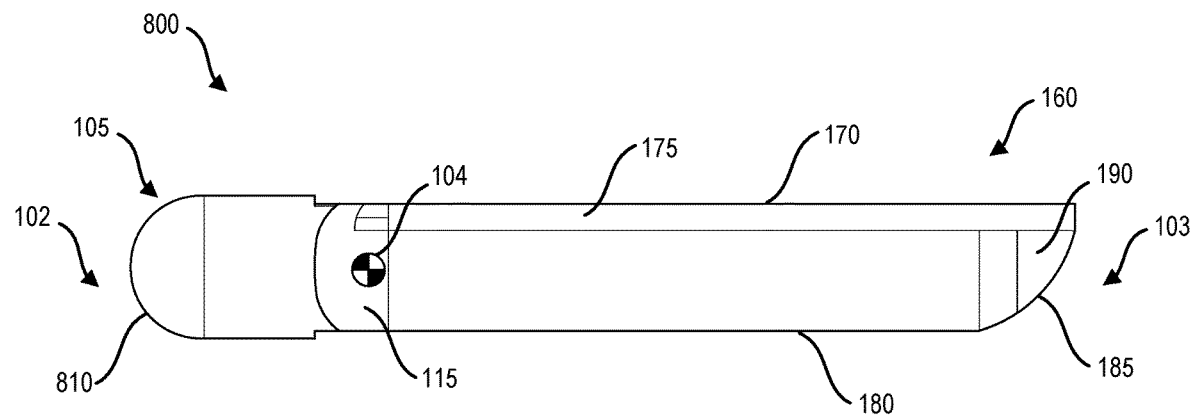
FIG. 8 shows a bottom view of an example non-pyrotechnic aerial display apparatus without channels or vanes in a head portion.

FIG. 1 shows a preferred embodiment of the apparatus. FIG. 8 shows an alternate embodiment 800 of the flyer that may be simpler and less expensive to manufacture. The head portion 105 may have a hemispherical nose 810 without channels or vanes. The wing portion 160 and other aspects of the apparatus 800 may be similar to those of the apparatus 100 of FIG. 1.

Figure 2:
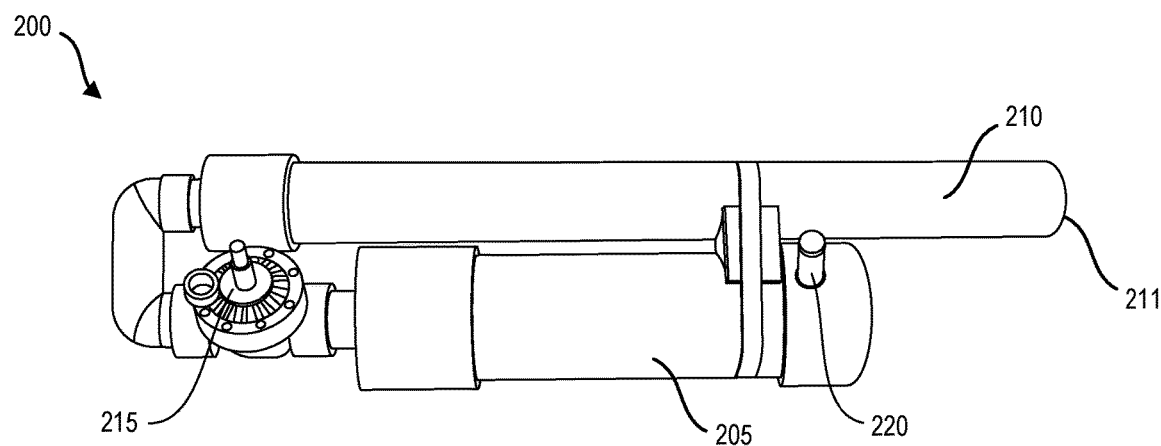
FIG. 2 shows a launcher for launching the apparatus of FIG. 1.

The launcher 200 may be a pneumatic gun, as shown in FIG. 2. The launcher 200 may include a pressure chamber 205 fluidly connected to a barrel 210. A flow control valve 215 may be located between pressure chamber 205 and the barrel 210. The flow control valve 215 may control flow of pressurized air from the pressure chamber to a barrel inlet. The launcher 200 may include a compressed air valve 220 that allows pressurized air to be added to the chamber 205 from an external source, such as an air compressor or compressed air line. The flyer 100 may be inserted into the barrel 210 through a barrel end 211. The barrel 210 may have an internal circumference that is slightly larger than the width ($w_1$) of the head portion 105 to provide adequate clearance. The barrel 210 may have a smooth interior surface. The barrel may be manufactured from a relatively low-cost material such as a metal or polymer pipe. The barrel may not require any internal rifling, due to the vanes 125 and channels 120 in the head portion 105 of the flyer. Consequently, a relatively low-cost barrel 210 can be used and may produce high exit velocities and launch heights (h). In one example, the barrel 210 can be a low-cost pipe, such as a plastic (e.g. PVC) or metal (e.g. copper) pipe.

Actuation of the flow control valve 215 may allow pressurized air to rapidly flow from the pressure chamber to a barrel inlet located behind the inserted flyer. The pressurized charge of air may apply force to rear surfaces (e.g. the first and second contoured surfaces 116, 117) of the flyer and propel the flyer out of the barrel 210 to a substantial height (h). In some examples, the pressure chamber 205 may store air at a pressure of about 30-80 psi. In some examples, the flyer 100 may launch to a height (h) of hundreds of feet into the air (e.g. 400-800 feet). The height (h) may be comparable to heights reached by conventional fireworks, thereby allowing the flyer to serve as a suitable substitute for conventional fireworks.

Figure 3:
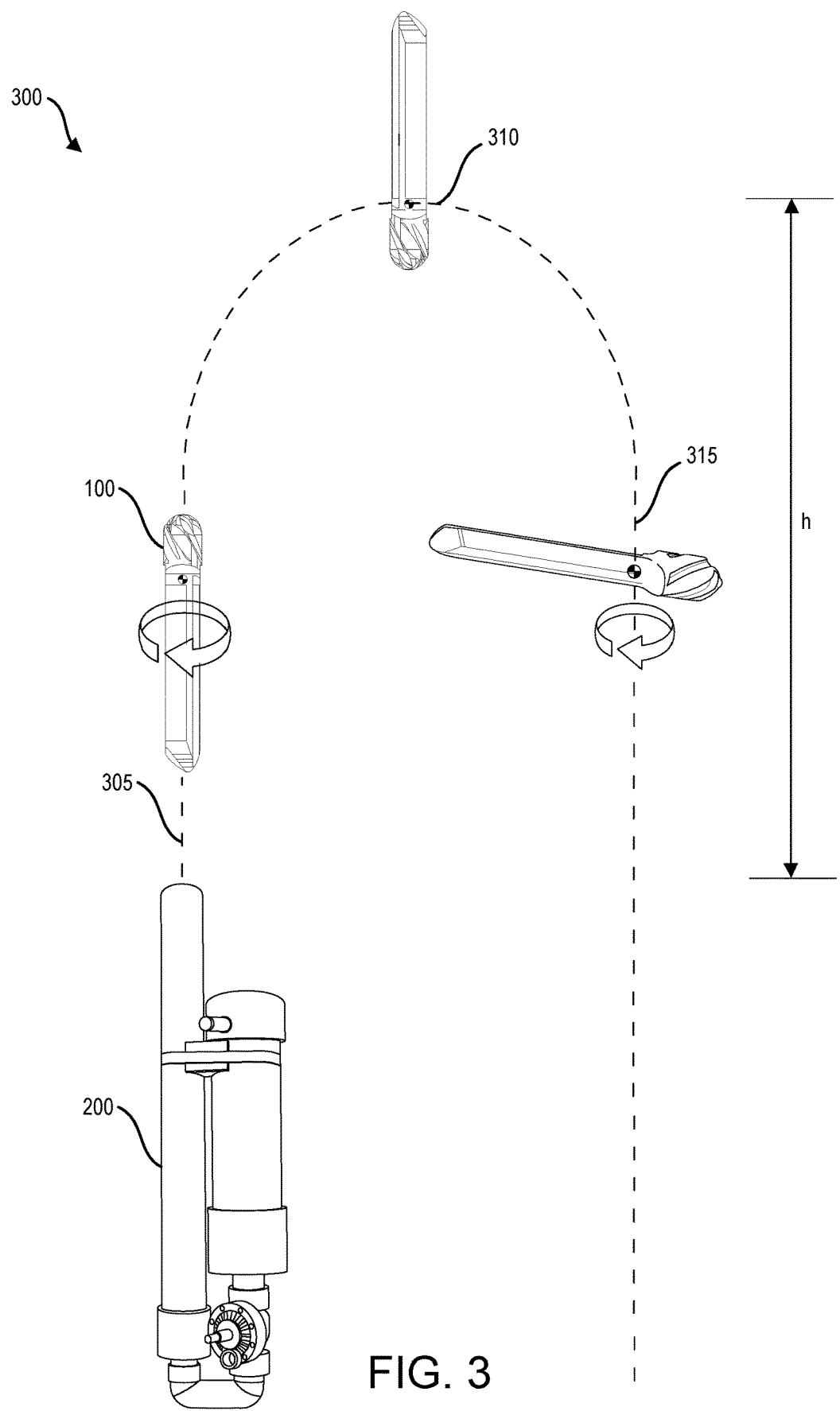
FIG. 3 shows a flight trajectory of the apparatus of FIG. 1 launched from the launcher of FIG. 2.

An example flight trajectory 300 of the flyer 100 is show in FIG. 3. The flight trajectory 300 may include a launch stage, an ascent stage 305, an apex stage 310, and a descent stage 315. During the ascent stage, the flyer 100 may launch upward like a rocket. Similar to a bullet fired from a rifled gun barrel, the flyer 100 may rotate about the first rotation axis 198 that is collinear with the central axis 197 of the flyer 100, as shown in FIG. 4. Rotation about the first rotation axis 198 may stabilize the flyer 100 and prevent the wing portion 160 from disrupting a substantially straight upward trajectory. In one example, the flyer 100 may rotate about the first rotation axis 198 at a rate of about 100-10,000 rpm. In another example, the flyer 100 may rotate about the first rotation axis 198 at a rate of about 100-5,000 rpm. When the flyer 100 reaches the apex 310, its upward velocity will decrease to zero, and the flyer will then reverse and begin to fall back toward earth. Due to the location of the center of gravity 104 of the flyer 100, the head portion 105 will reorient downward as the flyer begins to descend. As the flyer falls, the wing portion 160 will disrupt the descent and begin to generate lift. The counterweight 190 may induce rotation about the second rotation axis 199. More specifically, during the descent stage, the leading edge 170 of the wing portion 160 may produce lift and the counterweight 190 may encourage the wing portion to rotate about the second rotation axis 199, as shown in FIG. 5, similar to a falling maple leaf 600. In one example, the flyer 100 may rotate about the second rotation axis 199 at a rate of about 60 to 200 rpm. In another example, the flyer 100 may rotate about the second rotation axis 199 at a rate of about 100 to 140 rpm. The horizontal rotation may create a vortex with upward lift causing the flyer 100 to slowly descend to the ground with a helicopter-like rotation. The duration of the descent stage 315 may be significantly longer than the ascent stage 305. In one example, the duration of the descent stage may be at least twice as long as the ascent stage. In another example, the duration of the descent stage may be at least three times as long as the ascent stage. In another example, the duration of the descent stage may be at least five times as long as the ascent stage. In another example, the flyer 100 may launch at a velocity of about 120 to 170 mph and descend at a velocity of about 8-16 mph. In another example, the flyer may launch at a velocity of about 140 to 150 mph and descend at a velocity of about 10 to 14 mph.

A method of launching a non-pyrotechnic aerial display apparatus 100 can include providing a flyer 100 and a launcher 200. The flyer 100 can be inserted into the barrel 210 of the launcher 200. The barrel 210 may have a smooth interior surface. A charge of pressurized air can be introduced to the barrel 210 from the fluidly connected pressure chamber 205. The charge of pressurized air can have a pressure of about 30-80 psi. The charge of pressurized air can be introduced behind the head portion 105 of the flyer 100. The charge of pressurized air may propel the flyer 100 out of the barrel 210 at a relatively high velocity. As the flyer 100 is propelled from the barrel 210, vanes 125 and channels 120 in the head portion 105 of the flyer 100 may interact with passing air and induce axial rotation about the first rotation axis 198 that is collinear with a central axis 197 of the flyer 100, as shown in FIG. 4. Upon reaching the apex 310 of the flight trajectory 300, the upward velocity of the flyer 100 may decrease to zero and the flyer may reverse direction and begin falling toward earth. The wing portion 160 may interact with passing air and begin to generate lift. Due to the location of the center of gravity 104 of the flyer 100 and the presence of the counterweight 190, the lift generated by the wing portion 160 may induce rotation about a second rotation axis 199, as shown in FIG. 5.

It is understood that the invention is not confined to the particular construction and arrangement of parts herein illustrated and described, but embraces such modified forms thereof as come within the scope of the claims.

The foregoing description has been presented for purposes of illustration and description. It is not intended to be exhaustive or to limit the claims to the embodiments disclosed. Other modifications and variations may be possible in view of the above teachings. The embodiments were chosen and described to explain the principles of the invention and its practical application to enable others skilled in the art to best utilize the invention in various embodiments and various modifications as are suited to the particular use contemplated. It is intended that the claims be construed to include other alternative embodiments of the invention except insofar as limited by the prior art.

What is claimed is:

1. A reusable non-pyrotechnic aerial display apparatus comprising:
    a head portion comprising a front portion, a rear portion, and a central axis extending from the front portion to the rear portion, a plurality of channels in an outer surface of the head portion, the plurality of channels extending from the front portion to the rear portion;
    a wing portion extending rearward from the rear portion of the head portion, the wing portion comprising a top surface, a bottom surface, a leading edge, and a trailing edge;
    a first rotation axis collinear with the central axis, the first rotation axis intersecting a center of gravity of the apparatus, wherein the apparatus is configured to launch like a rocket during an ascent stage of flight, and wherein the apparatus rotates about the first rotation axis during the ascent stage of flight; and
    a second rotation axis that is nonparallel to the first rotation axis and intersects the center of gravity, wherein the apparatus is configured to descend with a helicopter-like rotation during a descent stage of flight, and wherein the apparatus rotates about the second rotation axis during the descent stage of flight.

2. The non-pyrotechnic aerial display apparatus of claim 1, further comprising an airfoil along the leading edge.

3. The non-pyrotechnic aerial display apparatus of claim 1, further comprising a plurality of vanes extending from the front portion to the rear portion.

4. The non-pyrotechnic aerial display apparatus of claim 1, further comprising a plurality of vanes extending from the front portion to the rear portion, each vane having a first portion with a first centerline, a second portion with a second centerline, the first and second centerlines forming an angle greater than ninety degrees.

5. The non-pyrotechnic aerial display apparatus of claim 1, further comprising a counterweight located in a rear quarter of the apparatus.

6. The non-pyrotechnic aerial display apparatus of claim 1, wherein the center of gravity is located in a front quarter of the apparatus.

7. The non-pyrotechnic aerial display apparatus of claim 1, further comprising a forward-facing light in the front portion of the head portion and a rearward-facing light in the rear portion of the head portion.

8. A non-pyrotechnic aerial display apparatus comprising:
    a head portion comprising a front portion, a rear portion, a plurality of channels in an outer surface of the head portion, the channels extending from the front portion toward the rear portion; and
    a wing portion extending rearward from the rear portion of the head portion, the wing portion comprising a top surface, a bottom surface, a leading edge, a trailing edge, and an airfoil extending along the leading edge, wherein a centerline of the head portion is collinear with a centerline of the wing portion.

9. The non-pyrotechnic aerial display apparatus of claim 8, further comprising a counterweight located at or proximate to the rear edge of the wing portion.

10. The non-pyrotechnic aerial display apparatus of claim 8, wherein the leading edge has a first thickness and the trailing edge has second thickness less than the first thickness.

11. The non-pyrotechnic aerial display apparatus of claim 8, the head portion further comprising a transition region between the head portion and the wing portion, the transition region comprising a first contoured surface extending from an outer surface of the head portion to the top surface of the wing portion and a second contoured surface extending from the outer surface of the head portion to the bottom surface of the wing portion.

12. The non-pyrotechnic aerial display apparatus of claim 8, further comprising:
    a forward-facing light emitting diode disposed in the front portion of the head portion; and
    a battery pocket located within the head portion, the battery pocket intersected by a central axis of the head portion, the battery pocket comprising an electrical lead that is electrically connected to the forward-facing light emitting diode.

13. The non-pyrotechnic aerial display apparatus of claim 8, wherein the apparatus comprises an overall length, a center of gravity, and an intersection between the head portion and the wing portion, wherein the center of gravity is located a distance from the intersection that is less than or equal to 15% of the overall length.

14. A non-pyrotechnic aerial display apparatus comprising:
    a head portion comprising a front portion and a rear portion, the front portion comprising a hemispherical nose; and
    a wing portion extending rearward from the rear portion of the head portion, the wing portion comprising a top surface, a bottom surface, a leading edge, a trailing edge, an airfoil extending along the leading edge, and a counterweight located in a rear quarter of the apparatus.

15. The non-pyrotechnic aerial display apparatus of claim 14, wherein the wing portion has a maximum width that is less than or equal to a maximum width of the head portion.

16. The non-pyrotechnic aerial display apparatus of claim 14, further comprising a plurality of channels in an outer surface of the head portion, the channels extending from the front portion toward the rear portion of the head portion, wherein each channel comprises an intake region proximate to the front portion of the head portion and an exhaust region proximate to the rear portion of the head portion.

17. The non-pyrotechnic aerial display apparatus of claim 14, wherein the apparatus has a center of gravity located closer to a front end of the apparatus than a rear end of the apparatus.

18. The non-pyrotechnic aerial display apparatus of claim 14, further comprising a central axis separating a leading edge side and a trailing edge side, further comprising a rear edge extending from the leading edge to the trailing edge, wherein the rear edge extends farther rearward on the leading edge side than on the trailing edge side.

19. The non-pyrotechnic aerial display apparatus of claim 14, further comprising a plurality of channels in an outer surface of the head portion, the channels extending from the front portion toward the rear portion of the head portion, wherein each channel is nonparallel to a central axis of the apparatus.

20. The non-pyrotechnic aerial display apparatus of claim 14, further comprising a spine extending along the leading edge and from the head portion to the counterweight.

\* \* \* \* \*